United States Patent [19]

Tao et al.

[11] Patent Number: 4,569,044
[45] Date of Patent: Feb. 4, 1986

[54] DISTRIBUTED DATA COMMUNICATION SYSTEM

[75] Inventors: Xueyu Tao, Cleveland; Charles W. Rose, Cleveland Heights, both of Ohio

[73] Assignee: Case Western Reserve University, Cleveland, Ohio

[21] Appl. No.: 498,047

[22] Filed: May 25, 1983

[51] Int. Cl.$^4$ .......................... H04J 3/02; H04J 3/16; H04I 1/00
[52] U.S. Cl. ........................................ 370/85; 370/60; 370/89; 370/100; 340/825.5
[58] Field of Search ...................... 370/85, 94, 60, 86, 370/90, 100, 89; 340/825.5

[56] References Cited

U.S. PATENT DOCUMENTS

| | | |
|---|---|---|
| 4,063,220 | 12/1977 | Metcalfe et al. |
| 4,096,355 | 6/1978 | Rothauser |
| 4,199,661 | 4/1980 | White et al. ................. 340/825.5 |
| 4,227,178 | 10/1980 | Gergaud et al. |
| 4,293,948 | 10/1981 | Soderblom |
| 4,301,521 | 11/1981 | Kelm ................. 370/86 |
| 4,332,027 | 5/1982 | Malcolm et al. |
| 4,451,827 | 5/1984 | Kahn et al. ................. 370/94 |
| 4,464,749 | 8/1984 | Ulug ................. 370/85 |

OTHER PUBLICATIONS

Multiaccess Protocols in Packet Communication Systems, Tobagi, IEEE Transactions on Communications, vol. COM-28, No. 4, Apr., '80.
Distributed Scheduling Conflict-Free Multiple Access for Local Area Communication Networks, J. W. Mark, IEEE Transactions on Communications, vol. COM-28, No. 12, Dec., 1980.

Primary Examiner—Douglas W. Olms
Assistant Examiner—Curtis Kuntz
Attorney, Agent, or Firm—Fay, Sharpe, Fagan, Minnich & McKee

[57] ABSTRACT

A passive arbitration system is employed for distributed, asynchronous, collision-free packet communication access scheduling along a high speed bus medium (1). First and second monitor end stations (2,3) are provided at opposite ends of the bus medium. A first plurality of data stations (4) and a second plurality of data stations (6) are operatively connected with the bus medium. The first monitor end station broadcasts a first synchronization header ($SH_1$) which polls the first group stations. The first group stations with no data to transmit respond to the synchronization header by blocking themselves. The one of the first group stations which has data to transmit and which first receives the first synchronization header alters it and transmits a data packet on the bus member. First group stations downstream are inhibited from transmitting by the altered first synchronization header. After the one station transmits its data packet and receives an acknowledgement, it transmits an unaltered first synchronization header. This process is repeated until each first group station with data to transmit has transmitted its data. When the first synchronization header is received unaltered by the second monitor end station, the second monitor end station transmits a second synchronization header ($SH_2$). The second synchronization header resets the first group stations and polls each of the second group stations. When all the second group stations have been polled, an unaltered second synchronization header is received by the first monitor end station which starts another polling cycle.

16 Claims, 15 Drawing Figures

DISTRIBUTED DATA COMMUNICATION SYSTEM

TECHNICAL FIELD

This invention relates to the art of distributed data communication. The invention finds particular application in bus communication systems which transmit data packets between a plurality of stations and will be described with particular reference thereto. It is to be appreciated, however, that the invention is also applicable to other communication systems.

THE PRIOR ART

Heretofore, communication in distributed multistation systems was commonly implemented with packet broadcasting. In packet broadcasting, each message or transmission unit was segmented into transmission segments or packets. The message commonly included an address transmission field to indicate a specific receiving station or that the transmission was intended for reception by all stations. To implement the distributed multistation packet broadcasting system, a high bandwidth common channel was shared among many contending stations. The station which momentarily had control of the common channel transmitted its message including its data packet. This mode of operation was advantageous in that it combined the advantages of both packet switching and broadcast communication. Packet switching offered efficient sharing of communication resources, whereas broadcast communication eliminated complex topology and routing problems.

To eliminate contention among the many stations, a means of access control, i.e. a multi-access protocol, was established. There were two common multi-access protocols: time-division multiplexing (TDM) and frequency-division multiplexing (FDM). In frequency-division multiplexing, an available range of frequencies was divided or allocated among the stations. Frequency-division multiplexing was a relatively expensive access protocol. In time-division multiplexing, the stations share a single "baseband" frequency which was implemented with less expense. Time-division multiplexing was commonly either synchronous (STDM) or asynchronous (ATDM). In synchronous time-division multiplexing, a centralized controller cyclically assigned a time slice to each station without regard to whether or not the station needed access to the common channel. The synchronous time-division multiplexing tended to be time wasteful, particularly when the data traffic was highly bursty. Asynchronous time-division multiplexing provided common channel access only to those stations which requested access, i.e. a demand access scheme. Asynchronous time-division multiplexing was commonly either random or controlled.

The most common random form of asynchronous time-division multiplexing was carrier-sensed multiple access (CSMA) which was an indeterministic, distributed protocol. The carrier-sensed multiple access protocols utilized either a collision detection technique (CSMA/CD) or a collision avoidance technique (CSMA/CA) in controlling access to the common channel. A primary drawback of the carrier-sensed multiple access protocol resided in the indeterministic access delay which resulted from the overhead time to resolve collision situations. In heavy traffic conditions, the collision resolution times were particularly troublesome. Under the collision detection form of carrier-sensed multiple access protocol, the packet and message sizes were limited. To guarantee collision detection, the message duration had to be shorter than the common channel propagation delay. Under the collision avoidance form of the carrier-sensed multiple access protocol, the combination of data messages and return acknowledgements complicated the collision avoidance techniques.

The controlled asynchronous time-division multiplexing was deterministic. A polling policy was established to determine the access order of the stations. The polling policy was implemented by a periodic access control information exchange and decision making. The access control information exchange was either explicit, i.e. each communication contained a successor station's address, or implicit, i.e. the stations were accessed in a natural order such as next-neighbor to next-neighbor. Commonly, the polling policy included either central polling implemented by a centralized controller or distributed polling which did not require centralized control. Numerous polling policies have been utilized. One of the polling policies was explicit central polling with central arbitration in which polling and access decisions were controlled by the central controller. The drawbacks of this polling policy included a lack of efficiency and susceptibility to central system failure. Hub polling utilized explicit central polling but with distributed arbitration of access to the common channel. Daisy chain polling policy utilized an implicit central polling with distributed arbitration. In distributed polling which was essentially a self-polling scheme, each station started polling and made arbitration and access decisions independently. Token passing was an implicit self-polling scheme. Logic ring polling was an explicit self-polling scheme. In central polling, the central controller was a potential catastrophe point. Self-polling schemes were vulnerable to failure attributable to their circulating mode. Whenever the polling scheme failed, the whole system became paralyzed. Daisy chain and token passing polling policies all required active interface insertion to insure unidirectional transmission. That is, the common channel had to be severed and a unidirectional gate inserted between each station to insure that transmissions moved unidirectionally. This rendered it difficult to add or subtract stations and any such additions or subtractions of stations affected the operation of the system. Other problems with daisy chain and token passing polling policies are their reliability and overhead time delay.

On the whole, all asynchronous time-division multiplexing systems required some associated overhead. The extent of this overhead determined the efficiency of the asynchronous time-division multiplexing system. Random asynchronous time-division multiplexing systems functioned better with light traffic and controlled asynchronous time-division multiplexing systems performed better in heavy data traffic. However, over a wide range of traffic conditions, both random and controlled asynchronous time-division multiplexing had drawbacks and inefficiencies.

SUMMARY OF THE INVENTION

In accordance with the present invention, there is provided a distributed, asynchronous, collision-free data packet communication system which overcomes the above-referenced problems and others.

In accordance with the present invention, there is provided a method of data communication among a plurality of data communication stations which are electrically connected with a common bus medium. A synchronization header is transmitted along the bus medium. Each of the stations receives the synchronization header in order as it travels along the bus medium. One of the communication stations which has data to transmit alters the synchronization header such that the altered synchronization header disables other communication stations downstream along the bus medium from transmitting. Stations which do not alter the synchronization header, such as stations which do not have data to transmit, block themselves until the next polling turn. The one station which altered the synchronization header transmits a data packet along the bus medium in conjunction with the altered synchronization header. Subsequent to transmission of the data packet and reception of an acknowledgement, the transmitting station blocks itself and an unaltered synchronization header is transmitted along the bus medium. Another station which has data to transmit receives the unaltered synchronization header and the method is repeated. In this manner, a unidirectional polling sequence is established on a bidirectional bus medium.

In one embodiment of the invention, the station which altered the synchronization header transmits the unaltered synchronization header subsequent to transmission of the data packet and receipt of an acknowledgement. This provides a distributive polling system. In another embodiment, the subsequent unaltered synchronization headers are transmitted from a monitor end station disposed adjacent one end of the bus medium. In this manner, a central polling system is provided.

In accordance with another aspect of the present invention, there is provided a conceptual loop method of transmitting data among a plurality of data stations including at least first and second groups of data stations which are electrically connected with a common bus medium. A first synchronization header which addresses the first group of stations is transmitted along the bus medium from adjacent a first end thereof. As the synchronization header passes first group stations with no data to be transmitted, those stations block themslves until the next polling cycle. The first synchronization header is received at one of the first group stations which has data to transmit. The one first group station with data to transmit alters the first synchronization header such that the altered first synchronization header continues traveling along the bus medium and disables downstream first group stations from transmitting. The first group station which altered the synchronization header transmits a data packet in conjunction with the altered first synchronization header. After transmitting the data packet and receiving an acknowledgement, the first group station which altered the first synchronization header transmits an unaltered first synchronization header along the bus medium and blocks itself from altering other first synchronization headers until the next loop cycle. This process is repeated by any additional first group stations which have data to transmit. When all the first group stations which have data to transmit have transmitted the data, the unaltered first synchronization header is received adjacent a second end of the bus medium. The second group stations are reset, in the preferred embodiment, by the passing first synchronization headers. In response to receiving the unaltered synchronization header, a second synchronization header is transmitted from the bus medium second end toward the bus medium first end. The second synchronization header is received by one of the second group stations which has data to transmit. The second group stations with no data to transmit block themselves until the next cycle. The second group station with data to transmit alters the second synchronization header such that the altered second synchronization header continues along the bus medium inhibiting other second group stations from transmitting. The second group station which altered the synchronization header transmits a data packet in conjunction with the altered second synchronization header. Subsequent to transmission of the data packet and receipt of an acknowledgement, the second group station disables itself until the next cycle and transmits an unaltered second synchronization header. This process is repeated by any other second group stations with data to transmit. When the unaltered second synchronization header is received adjacent the first bus medium end, another first synchronization header is transmitted and the process repeated. The blocked first group stations are reset, such as by passage of the second synchronization header, before the start of the next polling cycle.

In accordance with another aspect of the present invention, there is provided a data communication system. A monitor end station is operatively connected with a bus medium. The monitor end station selectively transmits at least one synchronization header along the bus medium. A plurality of data stations are operatively connected with the bus medium. Each data station includes a receiving means, first logic means, data transmitting means, and overwrite means. The receiving means receives messages passing along the bus medium. The first logic means determines whether the data station has data to transmit on the bus medium. Further, the logic means controls blocking of station and resetting of the station. The data transmitting means selectively transmits data from the station along the bus medium. The overwrite means selectively alters the first synchronization header. The overwrite means is enabled by the logic means when the station has data to transmit and enables the data transmitting means in response to altering an unaltered first synchronization header.

In accordance with yet another aspect of the present invention, the data communication system further includes a second monitor end station operatively connected with the bus medium for transmitting a second synchronization header along the bus medium in response to receiving an unaltered first synchronization header. A plurality of second data stations are operatively connected with the bus medium. Each second data station includes a receiving means, a logic means, a data transmitting means, and an overwrite means which operate in conjunction with the second synchronization headers in the same manner as the corresponding means of the first data stations.

ADVANTAGES OF THE INVENTION

One advantage of the present invention is that it provides a passive arbitration for distributed access scheduling.

Another advantage of the present invention is that it provides an efficient and robust multi-access protocol. The invention provides a relatively small access scheduling delay which improves performance under a wide range of traffic conditions.

Still another advantage of the present invention is that it provides collision-free communication which integrates transmission acknowledgements efficiently into the system.

Yet other advantages of the present invention will become apparent upon reading and understanding the following detailed description of the preferred embodiment.

BRIEF DESCRIPTION OF THE DRAWINGS

The present invention may take form in various steps and arrangements of steps or in various parts and arrangements of parts. The drawings are only for purposes of describing a preferred embodiment of the invention and are not to be construed as limiting it.

DETAIL DESCRIPTION OF THE PREFERRED EMBODIMENTS

Figure 1A:
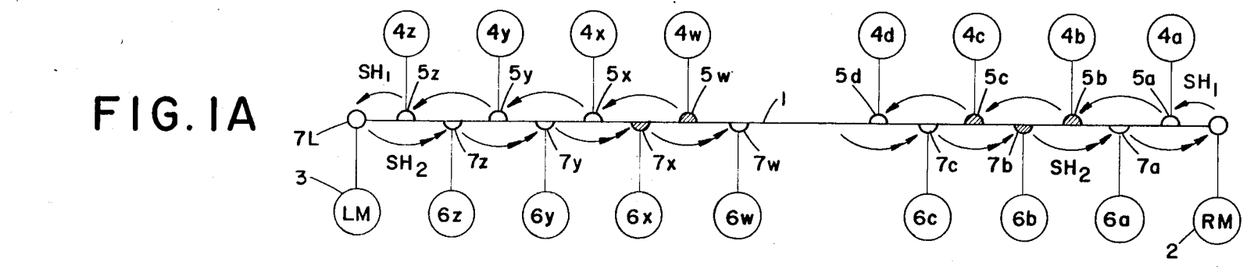
FIGS. 1A, B, and C, illustrate close-ended, open-ended, and centrally polled data transmission systems, respectively, in accordance with the present invention.
Figure 1B:
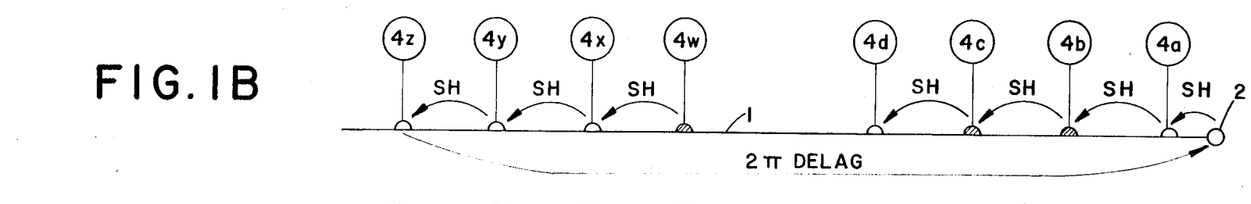
Figure 1C:
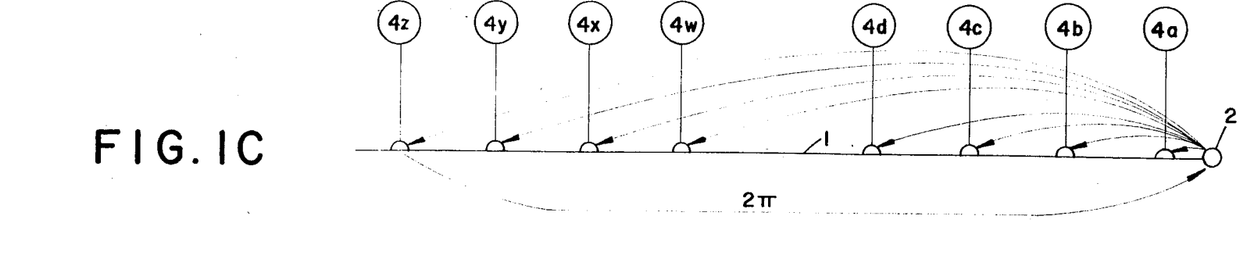
Figure 4:
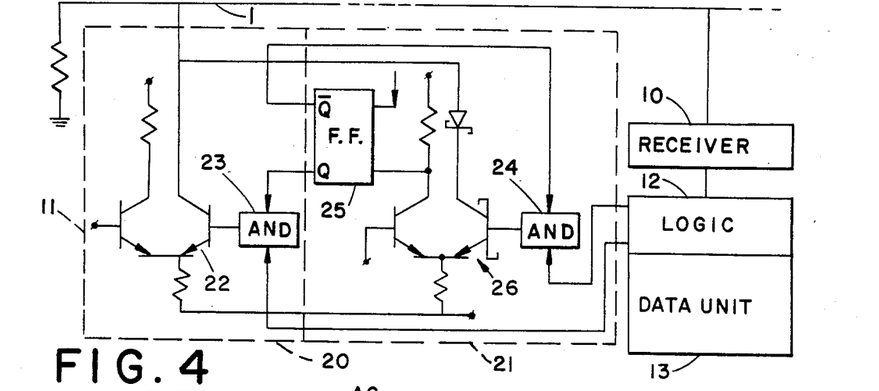
FIG. 4 is a schematic of a transmitter and overwrite detector in conjunction with a data station.

With reference to FIGS. 1A, B, and C, a data transmission system includes a transmission medium or bus 1. A first or right monitoring end station 2 and a second or left monitor end station 3 which are connected adjacent opposite ends of the bus medium. A plurality of data stations are connected with the bus medium between the monitor end stations. In the embodiment of FIG. 1, the plurality of intermediate data stations includes a first group of stations 4a, 4b, 4c, . . . , 4z which are connected with the bus medium by a first group of taps 5a, 5b, 5c, . . . , 5z, respectively, and a second group of stations 6a, 6b, 6c, . . . , 6z which are connected with the bus medium by a second group of taps 7a, 7b, 7c, . . . , 7z. With reference to FIG. 4, each station includes a transmission receiving means 10 for receiving transmissions along the bus medium, a transmitting means 11 for transmitting messages on the bus medium, and a logic or control means 12 which receives messages from the receiving means 10 and which controls the transmitting means 11. The intermediate data stations further include a remote data unit 13. The remote data units include conventional computer peripherals, I/O devices which perform such functions as collecting data, e.g. temperature, the occurrence of an event, or the like, processing or handling data, controlling a machine or apparatus in response to received data, feeding back information concerning the functioning of the machine, and other such conventional operations. Although the right and left monitor end stations need include only the receiving, transmitting, and logic control means, each may further include data handling means such as computer peripherals, I/O device and the like, i.e. may be the same hardware as the intermediate stations.

Figures 3, 6, 7:
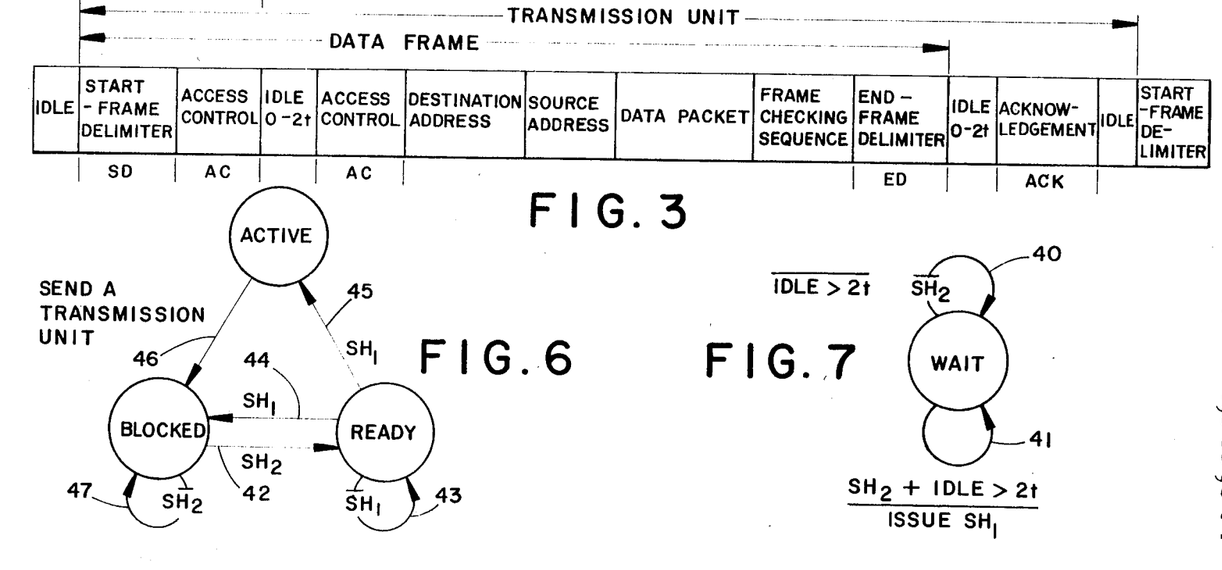
FIG. 3 illustrates the format of transmission units transmitted by stations of the preferred embodiment.
FIG. 6 is a state diagram of an exemplary data station.
FIG. 7 is a state diagram for an exemplary monitor end station.

With reference to FIG. 3, in the preferred embodiment, various messages are transmitted along the bus medium 1. Data are transmitted in a transmission unit which includes three transmission segments. The first transmission segment, which is made by the monitor end stations and in some embodiments the intermediate stations, is a synchronization header (SH). The synchronization header is a front part of the transmission unit. Specific to the preferred embodiment, the synchronization header includes a start-frame delimiter (SD) and a front portion of an access control (AC), specifically, a synchronization header address which identifies each station group. The second transmission segment includes a rear portion of the access control (AC) field, a destination address field, a source address field, a data packet, a frame checking sequence field, and an end-frame delimiter field. Upon receiving a data message, the receiving station transmits the third segment which is an acknowledgement segment (ACK) that marks the completion of a successful data frame transfer.

Briefly stated, operation is started by one of the monitor end stations transmitting the synchronization header along the bus medium from one toward the other. As the synchronization header propagates along the bus medium, each data station, in turn, receives the transmission. The intermediate data stations that do not desire to transmit detect the synchronization header and block themselves from transmitting until the next polling cycle. The first data station which has data to transmit receives the synchronization header and alters it by adding an overwrite code on the end. More specifically, it adds an overwrite code to a preselected portion of the access control field. Subsequent stations which receive the synchronization header plus the overwrite code block themselves from transmitting until they receive an unaltered synchronization header absent the overwrite code. The winning station, i.e. the first to add the overwrite code, continues to transmit the remainder of the data frame. Upon receiving the appropriate acknowledgement, the winning station blocks itself from responding to a synchronization header until the next cycle.

In the open and closed-ended self-polling modes of FIGS. 1A and 1B, the winning station responds receipt of the acknowledgement by transmitting another synchronization header. Although the synchronization header propagates from the winning station in both directions, the upstream stations have previously blocked themselves from competing for the bus medium until the next cycle. Thus, only the downstream stations are able to seize the bus medium. When all the stations which desire to transmit have transmitted, the monitor end station starts another cycle.

In the preferred polling mode of FIG. 1A, a conceptual closed-end loop polling scheme is provided. The left and right monitor end stations each transmit unique synchronization headers $SH_1$ and $SH_2$, respectively. The synchronization headers include the first one or more bits of the access control field address. By including one bit of the access code, each synchronization header can carry sufficient address to differentiate between two interdigitated groups of data stations; by including two bits, four groups can be differentiated; and so forth. The first group of intermediate data stations 4 are addressed by the first synchronization header $SH_1$ and the second group of stations 6 are addressed by the second synchronization header $SH_2$. The right monitor end station 2 transmits the first synchronization header $SH_1$. As the first synchronization header $SH_1$ travels along the bus medium, it is received by each first group station. Those stations with no data to transmit respond to the synchronization header by blocking themselves until the next cycle. The closest first group station to the right end which desires to transmit, e.g. station 4b, adds the overwrite code to the synchronization header and adds the other fields to complete the data frame. The downstream first group stations which desire to transmit receive the synchronization header and try to add the overwrite code to seize the bus medium. However, the overwrite code added by the station 4b blocks downstream stations from successfully seizing the bus medium. Upon receiving the acknowledgement code from the data receiving station, the first group station 4b transmits another unaltered first synchronization header $SH_1$ and blocks itself until the next cycle. The next downstream data station which desires to transmit, e.g. data station 4c, adds the overwrite code, transmits its data, and transmits another unaltered first synchronization header. The upstream first data stations do not compete for the bus medium because they either (1) had no data to transmit at the beginning of the cycle and blocked themselves or (2) transmitted their data and have blocked themselves. This process is repeated until each first group station with data to transmit has transmitted, i.e. the first synchronization header $SH_1$ reaches the left monitor end station 3 unaltered by the overwrite code.

With continued reference to FIG. 1A, the left-hand monitor end station 3 responds to the unaltered first synchronization header by transmitting the second synchronization header $SH_2$ which addresses the second group stations 6. The first group stations receive the second synchronization headers and reset themselves, i.e. change from the blocked state to a ready state. Analogously, the left-most second group station which desires to transmit, e.g. second group station 7x, seizes control of the bus medium by altering the second synchronization header with an overwrite code. The winning second group station 7x transmits its data, receives an acknowledgement from the station receiving the data, and transmits another unaltered second synchronization header $SH_2$. When each of the second group station which want to transmit have transmitted, the right monitor end station 2 receives the unaltered second synchronization header $SH_2$ unemcumbered by the overwrite code. The right monitor end station responds by transmitting the first synchronization header $SH_1$ starting the process over again. The first synchronization headers serve to reset the second group stations for the next cycle. Alternately, the monitor end stations may reset the respective first and group stations at the start of each pollig half cycle. In this manner, an implicit distributed polling loop is provided.

Further, the end stations monitor the bus for a lack of activity. If the bus medium has no transmissions for longer than a round trip transmission, it is an indication of a malfunction which requires restarting of the polling. Further, if either end station malfunctions, the other end station recognizes its failure to transmit and assumes its responsibilities by transmitting both first and second synchronization headers. If one end station assumes the duties of the other, the system functions essentially in the open-ended mode described in conjunction with FIG. 1B.

An open-ended self-polling mode is illustrated in FIG. 1B. Again the monitor end station 2 transmits a synchronization header SH. The stations with no data to transmit respond to the synchronization header by blocking themselves. The first station with data to transmit adds the overwrite code and the other fields to complete the data frame. Upon receiving an acknowledgement, the first transmitting station transmits another synchronization and blocks itself until the next cycle. The next station with data to transmit receives the synchronization header, adds the overwrite code and the other fields of the date frame. On receiving an acknowledgement, the second transmitting stations retransmits the synchronization header and blocks itself. This process continues until all of the stations with data to transmit have transmitted, at which time all the intermediate data stations are in a blocked state. The monitor end station recognizes the all stations blocked condition by a lack of messages on the bus medium for a time longer than the round trip delay. The round trip delay time is the time for the synchronization header to travel to the most distant data station and for an idle status to return, i.e. a silent acknowledgement. The monitor end station responds to the blocked state by resetting all the stations and starting another cycle.

A central polling mode is illustrated in FIG. 1C. The monitor end station 2 transmits a synchronization header SH. The stations without data to transmit respond by blocking themselves. The first station with data to transmit overwrites the synchronization header, transmits its data, receives acknowledgement, and blocks itself. The monitor end station receives the acknowledgement and responds by transmitting another synchronization header. This process continues until all stations are blocked, i.e. the monitor end stations detects that the bus medium is idle for longer than the round trip delay. The data stations respond to this condition by resetting themselves and the monitor end station responds by starting another cycle.

Figure 2:
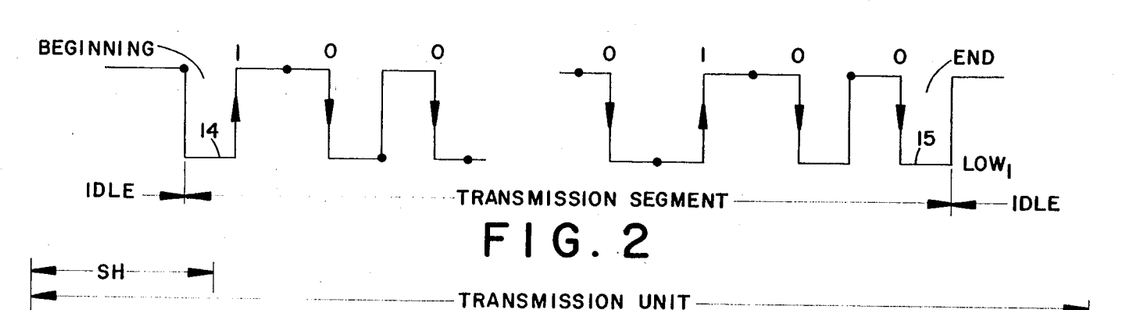
FIG. 2 illustrates a Manchester encoded transmission segment waveform as transmitted by stations of the preferred embodiment.

Looking now to the specific overwrite code of the preferred embodiment, reference is first made to FIG. 2. Each transmission segment which utilizes a Manchester encoding scheme has a leading half bit low 14 at its beginning and a trailing half bit low 15 at its other end. The leading and trailing half bit lows distinguish the segment from an idle or high status of the transmission medium.

With particular reference to FIG. 4, each of the transmitting means 11 includes a transmitting or sending means or portion 20 and an overwrite detecting means 21. The sending means 20 includes an open-collector transistor 22 under the control of an AND gate 23. The overwrite detecting means 21 includes an AND gate 24 which receives a high input from the logic means 12 when the station desires to send data and a high input from a flip-flop 25 when the sending means 20 is disabled from transmitting. Upon receiving two high inputs the overwrite detecting means AND gate 24 gates a Schottky transistor 26 conductive. The logic means provides a low output when it has no data to send and at the end of a data transmission to block the station.

The logic means further recognizes a reset signal, such as the other synchronization header, to ready the station.

With particular reference to FIGS. 5A–D and continuing reference to FIG. 4, the overwrite procedure will first be described in terms of a single station desiring to send data. The unaltered synchronization header SH (FIG. 5A) has a trailing half bit low 30. After the synchronization header trailing half bit, the potential on the bus medium returns to its high or idle state at 31. A station with data to transmit tries to add an overwrite code (FIG. 5B) to the synchronization header a time $t_1$ before the end of the trailing half bit 30. During time $t_1$, the low, inhibits the overwrite transistor emitter. Thus, any skewing of the overwrite leading edge during $t_1$ has no effect. With reference to FIG. C, as the potential increases, the current through the overwrite detecting means transistor 26 approaches a preselected emitter current $I_0$. When the current flow through the overwrite transistor 26 reaches $I_0$, the flip-flop 25 changes states enabling the transmitter AND gate 23 at time 32. The transmitting transistor 22 clamps the bus member 1 to its normal logic low, $low_1$, for a half bit duration $t_4$. At time 33, the transmitting AND gate 23 under control of the logic means 12 causes the transistor 22 to start the leading edge of the remainder of the access control field.

Figure 5A:
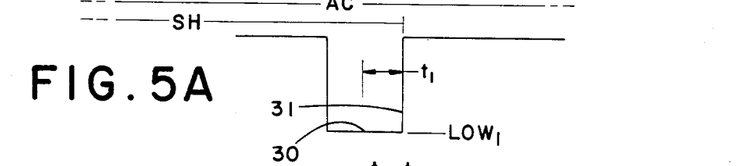
FIGS. 5A, B, C, and D are diagrams of waveforms as a function of time which illustrates a procedure and timing for overwriting and abritration.
Figure 5B:
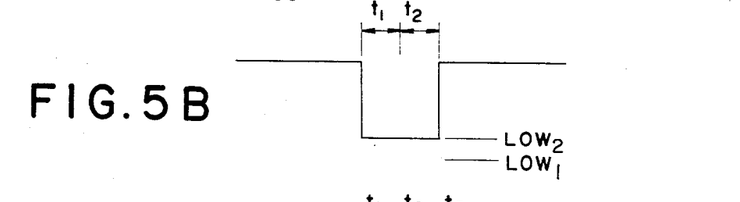
Figure 5C:
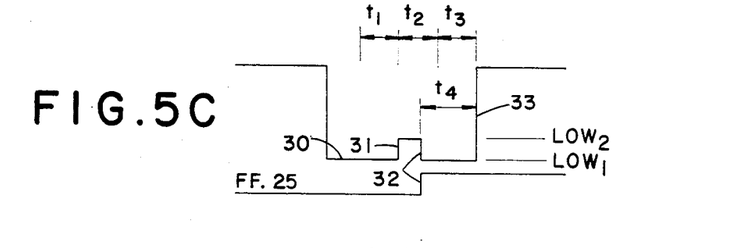
Figure 5D:
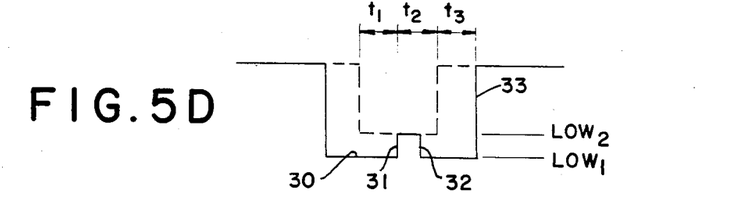

With reference to FIG. 5D, if the next adjacent downstream station also desires to transmit, then an overwrite arbitration situation arises. The second station overwrite detector receives the synchronization header trailing half bit 30 a short time later. The short delay time is determined by the transmission time between the two stations. For example, four meters of displacement produces about 20 nanoseconds of delay. Because the upstream, successful sending station has already limited the bus status to $low_2$, the emitting current in the downstream overwrite transistor 26 is much smaller than $I_0$. This blocks the downstream, unsuccessful sending station from triggering its flip-flop and entering its transmission mode. The downstream logic means recognizes a synchronization header followed by a delay and responds by disabling the station until the next turn, i.e., receipt of the next synchronization header.

The small current drawn by the adjacent downstream unsuccessful sending station affects the upstream winning station. The round trip transmission time (between the two competing stations) is sufficiently long that the overwrite transistor 26 of the winning sending station reaches the $I_0$ current level and triggers the flip-flop. As the current drawn by the downstream unsuccessful sending station increases, the current through the winning station overwrite transistor 26 decreases. The current through the two overwrite transistors reaches equilibrium at about $I_0/2$, which is insufficient to trigger the flip-flop. If three stations are competing, the current will approach to $I_0/3$, and so forth. This current balance is the overwrite interference. Although the current through the winning station overwrite transistor 26 becomes too small to gate a flip-flop, the flip-flop 25 has previously been triggered and remains in the transmission enabling state. Analogously, the downstream, unsuccessful sending station transistor current cannot exceed $I_0/2$ and, accordingly, cannot trigger its flip-flop to enable its sending means. The downstream unsuccessful sending stations will retain their flip-flops at zero and abort their transmission attempts without disrupting the frame transmission of the successful sending station. The continuous transmission period $t_3$ of the winning sending station is chosen such that it (1) offers a time window to avoid trailing edge skewing of the overwrite code, (2) eliminates the possible overwrite interference without corrupting the following transmission, and (3) restores the overwrite transistor emitter current. After the period $t_3$ the winning station continues to transmit the remainder of its data frame including the remainder of the access control field and the other fields of the data frame.

The balance time for the current through the adjacent sending stations to reach equilibrium can also be used for overwrite detection purposes. The smaller the $low_2$ level of fluctuation is, the longer the balance time will take. The Schottky transistor used in the overwrite detector can take advantage of the smaller $low_2$ fluctuations with a quick turnoff time. Because the transmitting means 20 is separated from the overwrite detector, the data transmission rate of the transmitting means 10 is not limited by the overwrite detector. The transmission rate need not be restrained by the period $t_3$.

With reference to FIGS. 6 and 7, state diagrams for a typical intermediate first group data station 4 and the monitor end station 2, respectively, are illustrated. The right monitor end station waits in a WAIT state 40 for the second synchronization header $SH_2$ to be received. Upon receipt of the second synchronization header, the right monitor end station propagates the first synchronization header $SH_1$ at 41 toward the left. Alternately, after an idle of longer than twice the propagation time between the end stations, the right monitor end station transmits the first synchronization header. All of the first group stations 4 which were in a blocked state are released by the second synchronization header and enter a ready state at 42. All of the first group of stations detect the first synchronization header at 43. The stations which do not desire to send detect a transition at the end of a synchronization header followed by an idle period of at least 40 nanoseconds, i.e. interstation round trip transmission time, after the first synchronization header and enter a blocked state at 44. The winning sending station detects the first synchronization header, overwrites it and enters an ACTIVE state at 45. The remaining sending stations receive the overwritten first synchronization header. Because the unsuccessful sending stations detect no transition at the end of the synchronization header, they stay in a READY state at 43. The winning sending station transmits a data frame and enters a BLOCKED state at 46. After the winning sending station receives the acknowledgement from the destination, it transmits another first synchronization header. The next downstream sending station overwrites the synchronization header causing the further downstream sending stations to remain in the READY state. The upstream non-sensing stations will detect the synchronization header with an idle gap transition at the end of the synchronization header and remain in the BLOCKED state. This process will be repeated until each sending station of the first group has been moved from READY to ACTIVE. The left monitor end station detects the unencumbered synchronization first synchronization header, changes it to a second synchronization header and the process is similar to the first group to the right with the second group of stations 6. The first group stations which are in the BLOCKED state are reset by the second synchronization header $SH_2$ at 47.

Figure 8:
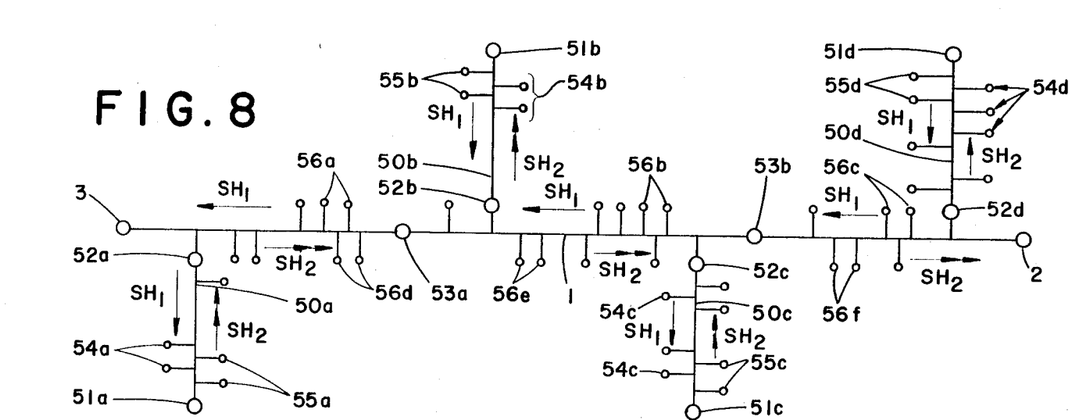
FIG. 8 illustrates an alternate embodiment to the transmission system of FIG. 1 in which the common bus is branched.
Figure 9:
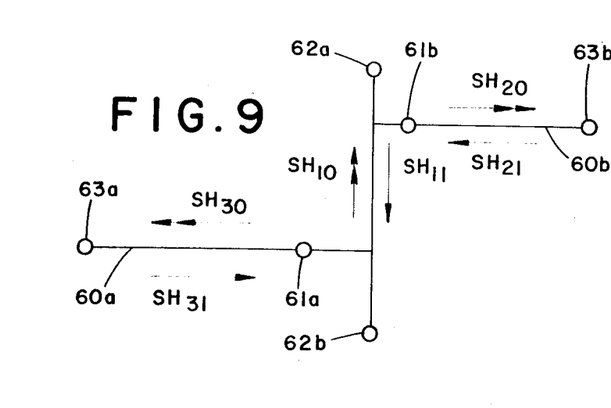
FIG. 9 illustrates yet another alternate embodiment of a branched transmission system in accordance with the present invention; and, FIG. 10 is a time versus signal amplitude diagram illustrating received synchronization.

The conceptual bus loop achieved through the use of a pair of monitor end stations can be used to construct various new topologies. FIGS. 8 and 9 are illustrative of two such additional topologies.

With reference to FIG. 8, in addition to the bus medium 1 and the right and left monitor end stations 2 and 3, four branches 50a, 50b, 50c, and 50d are provided. Monitor end stations 51a, 51b, 51c, and 51d are provided at the end of each branch. Interpolators 52a, 52b, 52c, and 52d are provided between the trunk bus 1 and each of the branches. Bidirectional repeaters 53a and 53b repeat the first synchronization headers in one direction and the second synchronization headers in the other. In the FIG. 8 multi-synchronization header system, the right monitor end station 2 transmits a first synchronization header $SH_1$ which polls the interpolators. The first interpolator 52d overwrites the $SH_1$ synchronization header on the trunk bus and generates a branch synchronization header $SH_2$ on the branch 50d. The $SH_2$ synchronization header sequentially polls each of a first group of intermediate stations 54d along the branch 50d in the manner described above. The end station 51d receives an unaltered $SH_2$ synchronization header and responds with an $SH_1$ synchronization header which polls a second group of intermediate stations 55d along the branch 50d. The interpolator 52d repeats the messages from the branch stations. At the conclusion of its transmission and the receipt of the appropriate acknowledgements, one of the branch stations 55d transmits a $SH_1$ synchronization header which is received unaltered by the interpolator 52d. The interpolator 52d repeats the synchronization header $SH_1$ onto the trunk bus where it polls trunk stations 56c. When repeater 53b receives an unaltered synchronization header, it repeats it onto the next segment of the trunk bus where additional trunk stations 56b are polled. When interpolator 52b receives an unaltered $SH_1$ synchronization header, a polling procedure on branch 50b is performed analogously to the polling of the intermediate stations on branch 50d. This process is continued until an unaltered $SH_1$ synchronization header reaches the left monitor end station 3. The left monitor end station 3 generates an $SH_2$ synchronization header which polls trunk stations 56d, 56e, 56f, interpolators 52a and 52c and their associated branch stations. When an unaltered $SH_2$ synchronization header is received by the right monitor end station 2, it responds by transmitting an $SH_1$ synchronization header starting another cycle. Thus, the data stations are polled in a preselected cyclic order or conceptual loop. As before, each station transmits the synchronization header with its associated data frame in both directions. The related upstream and downstream stations receive the synchronization header differently. Therefore a unidirectional polling sequence is insured. The upstream stations receive the synchronization header followed by an idle gap and the downstream stations receive the overwritten synchronization header. Therefore, a station may receive a transmission unit which consists of several message segments separated by idle gaps.

With reference to FIG. 9, a trunk bus 1 has a plurality of branches including branches 60a and 60b. Monitor end units 62a and 62b transmit synchronization headers on the trunk bus 1. Repeaters 61a and 61b repeat synchronization headers onto the branches 60a and 60b to poll first branch stations therealong. End stations 63a and 63b turn the branch polling over to poll second branch stations therealong. If the trunk bus 1 is relatively short and the number of branches relatively large, the trunk bus will play the role of a switch center and the topology will be similar to that of a star.

Figure 10:
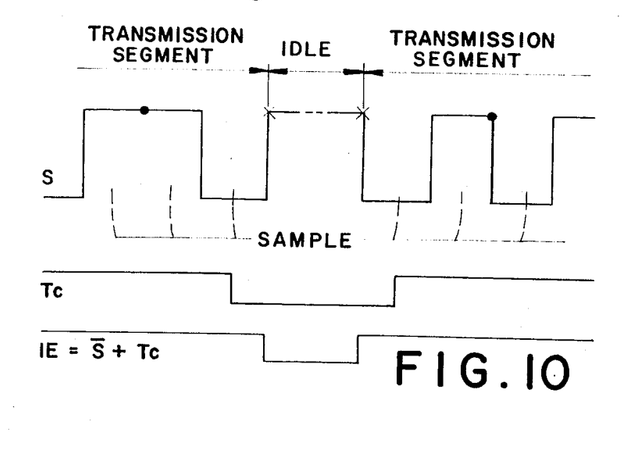

For self-clocking Manchester encoding, reception synchronization depends on the sample phase related to mid-bit transitions. Such a bit synchronization has no cumulative timing error. In the present system, each station transmits with an identical data rate without transport speed fluctuations. The main sample phase error is the edge time variations under different loads and distances. A digital phase-locked loop (DPLL) may be utilized in conjunction with the present invention to improve the reception synchronization quality. The digital phase-locked loop can be synchronized with a free running sample counter at the beginning of a message segment. However, if the sample error at the beginning is large, a relatively long time will be required to stabilize the digital phase-locked loop. To shorten the stabilization time, a flip-flop is set by the sampling at the end of each transmission segment and reset at the beginning of the next transmission segment as shown in FIG. 10. The flip-flop controls the idle escape (IE) which blanks the sample counter out during idle and synchronizes the separate transmission segments.

The invention has been described with reference to the preferred and alternate embodiments. Obviously, alterations and modifications will occur to others upon reading and understanding the preceding detailed description of the preferred embodiment. The invention is to be construed as including all such alterations and modifications insofar as they come within the scope of the appended claims and the equivalents thereof.

Having thus described a preferred embodiment, the invention is now claimed to be:

1. A method of transmitting data among a plurality of data stations including at least first and second groups of data stations which are electrically connected with a common bus medium, the method comprising:
    (a) transmitting a first synchronization header along the bus medium from adjacent a first end thereof, the first synchronization header addressing the first group of stations;
    (b) receiving the first synchronization header at one of the first group stations;
    (c) altering the first synchronization header at said one first group station such that the altered first synchronization header continues traveling along the bus medium, the altered first synchronization header disabling other first group stations from transmitting;
    (d) transmitting a data packet segment along the bus medium from said one first group station in conjunction with the altered first synchronization header;
    (e) subsequent to transmission of the one data packet blocking the one first group station from altering first synchronization headers and transmitting another unaltered first synchronization header from said one first group station along the bus medium subsequent to transmission of one data packet;
    (f) receiving the unaltered first synchronization header adjacent a second end of the bus medium;
    (g) in response to receiving the unaltered first synchronization header adjacent the bus medium second end, transmitting a second synchronization header from the bus medium second end toward the bus medium first end, the second synchronization header addressing the second group stations;

(h) receiving the second synchronization header at one end of the second group stations;

(i) altering the second synchronization header at said one second group station such that the altered second synchronization header continues traveling along the bus medium toward the bus medium first end, the altered second synchronization header disabling other second group stations from transmitting;

(j) transmitting a data packet along the bus medium from said one second group station in conjunction with the altered second synchronization header;

(k) subsequent to transmission of the one data packet, blocking the one second group station from altering second synchronization headers and transmitting another unaltered second synchronization header from said one second group station along the bus medium;

(l) receiving the unaltered second synchronization header adjacent the bus medium first end;

(m) in response to receiving the unaltered second synchronization header adjacent the bus medium first end, transmitting the first synchronization header from the bus medium first end toward the bus medium second end; and, (n) cyclically repeating steps (a) through (g).

2. The method as set forth in claim 1 further including repeating steps (b) through (e) a plurality of times in conjunction with a plurality of the first group stations before performing step (f).

3. The method as set forth in claim 2 further including performing steps (h) through (k) a plurality of times in conjunction with a plurality of second group stations before performing step (l).

4. The method as set forth in claim 3 further including the steps of:

unblocking the blocked first group stations in response to the second synchronization header; and, unblocking the blocked second group stations in response to the first synchronization header.

5. A data communication system comprising:

(a) a bus medium;

(b) a first monitor station operatively connected with the bus medium, the first monitor station selectively transmitting a first synchronization header along the bus medium;

(c) a plurality of first data stations operatively connected with the bus medium, each first data station including:

(i) first logic means for determining whether the first data station has data to transmit on the bus medium;

(ii) a first data transmitting means for transmitting data from the first data station along the bus medium;

(iii) first receiving means for receiving communications traveling on the bus medium, the first receiving means being operatively connected with the bus medium and the first logic means;

(iv) a first overwrite means for selectively altering the first synchronization header, the first overwrite means being operatively connected with the first logic means to be enabled thereby in response to the first logic means determining that the first data station has data to transmit, the first overwrite means enabling the first data transmitting mean in response to altering an unaltered first synchronization header;

(v) the first logic means blocking the first overwrite means subsequent to the enabling of the first data transmitting means and unblocking the first overwrite means in response to a first reset condition.

6. The communication system as set forth in claim 5 further including:

(a) a second monitor end station operatively connected with the bus medium for transmitting a second synchronization header therealong in response to receiving an unaltered first synchronization header; and (b) a plurality of second data stations operatively connected with the bus medium, each second data station including:

(i) a second logic means for determining whether the second data station has data to transmit on the bus medium;

(ii) a second data transmission means for selectively transmitting data from the second data station along the bus medium;

(iii) a second receiving means for receiving the first and second synchronization headers, the second receiving means being operatively connected with the second logic means;

(iv) a second overwrite means for selectively altering the second synchronization header, the second overwrite means being operatively connected with the second logic means to be enabled thereby in response to the second logic means determining that the second station has data to transmit, the second overwrite means enabling the second data transmission means in response to altering an unaltered second synchronization header and second logic means blocking the second overwrite means subsequent to the second transmission means transmitting data and unblocking the second overwrite means in response to a second reset condition.

7. The data communications system as set forth in claim 6 wherein the first reset condition is receipt of the second synchronization header by the first receiving means and the second reset condition is receipt of the first synchronization header by the second receiving means.

8. The data communication system as set forth in claim 5 wherein the first transmitting means includes a transmitting transistor having an open-ended emitter, the transmitting transistor being operatively connected with the logic means to be gated by data therefrom.

9. The data communication system as set forth in claim 6 wherein the first overwrite means includes an overwrite transistor means which is selectively gated by the logic means to provide a current path from the bus medium, the current flow from the bus medium altering potentials thereon to alter the first synchronization header, and means responsive to the current flow reaching a preselected magnitude for enabling the first transmitting means, whereby when another first data station has already altered the first synchronization header, the altered potentials on the bus medium prevent the current flow from reaching the preselected level blocking the first transmitting means from being enabled.

10. A data communication system comprising:

(a) a bus medium;

(b) a monitor station operatively connected with the bus medium, the monitor station selectively transmitting a synchronization header along the bus medium;

(c) a plurality of data stations operatively connected with the bus medium, each data station including:

(i) a logic means for determining whether the data station has data to transmit on the bus medium;

(ii) a transmitting transistor with an open ended emitter operatively connected with the bus medium for transmitting data therealong from the data station, the transmitting transistor being operatively connected with the logic means to be selectively gated thereby;

(iii) receiving means for receiving communications traveling on the bus medium, the receiving means being operatively connected with the bus medium and the logic means;

(iv) an overwrite means for selectively altering the synchronization header, the overwrite means being operatively connected with the logic means to be enabled thereby in response to the logic means determining that the data station has data to transmit, the overwrite means enabling the data transmitting means in response to altering an unaltered synchronization header.

11. The data communication system as set forth in claim 10 wherein the logic means further blocks the overwrite means subsequent to transmitting data and unblocks the overwrite means in response to a reset condition.

12. A method of data communication among a plurality of data communication stations electrically connected with a bus medium, the method comprising:

(a) transmitting the synchronization header along the bus medium;

(b) receiving the synchronization header at one of the data communication stations which has data to transmit;

(c) altering the synchronization header at said one data communication station such that the altered synchronization header disables other data communication stations from transmitting;

(d) transmitting a data packet from said one communication station;

(e) blocking said one data communication station from altering synchronization headers subsequent to transmitting its data packet;

(f) transmitting an unaltered synchronization header along the bus medium subsequent to transmission of the data packet;

(g) repeating steps (b) through (f), each repetition enabling another data communication station with data to transmit its data packet;

(h) resetting the blocked data communication stations; and, (i) wherein the resetting step includes monitoring the bus medium for passage of a different synchronization header.

13. A method of data communication among a plurality of data communication stations electrically connected with a bus medium, the method comprising:

(a) transmitting a synchronization header along the bus medium;

(b) receiving the synchronization header at one of the data communication stations which has data to transmit;

(c) altering the synchronization header at said one data communication station such that the altered synchronization header disables other data communication stations from transmitting;

(d) transmitting a data packet from said one communication station;

(e) blocking said one data communication station from altering synchronization headers subsequent to transmitting its data packet;

(f) transmitting an unaltered synchronization header along the bus medium subsequent to transmission of the data packet;

(g) repeating steps (b) through (f), each repetition enabling another data communication station with data to transmit to transmit its data packet;

(h) resetting the blocked data communication stations; and, (i) wherein the step of transmitting data further includes transmitting a destination address which identifies a selected data communication station in conjunction with the data packet; and, further including the steps of:

(j) receiving at least the data packet at the selected data communication station; and, (k) transmitting an acknowledgement from the selected data communication station on the bus medium.

14. A method of data communication among a plurality of data communication stations electrically connected with a common bus medium, the method comprising:

(a) transmitting a synchronization header along the bus medium;

(b) receiving the synchronization header at one of the plurality of data communication stations;

(c) altering the synchronization header at said one data communication station such that the altered synchronization header disables other data communication stations from transmitting;

(d) transmitting a data packet and a destination address which identifies a selected data communication station from said one data communication station in conjunction with the altered synchronization header;

(e) receiving at least the data packet at the selected data communication station;

(f) transmitting an acknowledgement from the selected data communication station on the bus medium;

(g) receiving the acknowledgement at said one data communication station;

(h) transmitting from said one data communication station an unaltered synchronization header along the bus medium subsequent to receipt of the acknowledgement;

(i) the receiving step (e) further including receiving the synchronization header at a plurality of data communication stations which have no data to transmit and further including the step of blocking the dataless stations from altering synchronization headers;

(j) repeating steps (b) through (g) until all stations with data to transmit have transmitted the data; and, (k) blocking each transmitting station from altering synchronization headers subsequent to transmitting its data packet.

15. The method as set forth in claim 14 further including the step of resetting the blocked stations.

16. A method of data communication among a plurality of data communication stations electrically connected with a common bus medium, the method comprising:
- (a) transmitting a synchronization header along the bus medium;
- (b) receiving the synchronization header at one of the plurality of data communication stations;
- (c) altering the synchronization header at said one data communication station such that the altered synchronization header disables other data communication stations from transmitting;
- (d) transmitting a data packet and a destination address which identifies a selected data communication station from said one data communication station in conjunction with the altered synchronization header;
- (e) receiving at least the data packet at the selected data communication station;
- (f) transmitting an acknowledgement from the selected data communication station on the bus medium;
- (g) receiving the acknowledgement adjacent one end of the bus medium;
- (h) transmitting from adjacent the bus medium one end an unaltered synchronization header along the bus medium subsequent to receipt of the acknowledgement;
- (i) the receiving step (e) further including receiving the synchronization header at a plurality of data communication stations which have no data to transmit and further including the step of blocking the dataless stations from altering synchronization headers;
- (j) repeating steps (b) through (g) until all stations with data to transmit have transmitted the data; and,
- (k) blocking each transmitting station from altering synchronization headers subsequent to transmitting its data packet.

* * * * *